(12) United States Patent
Imseis

(10) Patent No.: US 6,637,789 B1
(45) Date of Patent: Oct. 28, 2003

(54) MULTIPLE STAGE SYSTEM FOR ABSORBING FORCE AND ENERGY ASSOCIATED WITH COLLISIONS OF A LAND VEHICLE

(76) Inventor: Jamal N. Imseis, 35049 Wellston Ave., Sterling Heights, MI (US) 48312

( * ) Notice: Subject to any disclaimer, the term of this patent is extended or adjusted under 35 U.S.C. 154(b) by 46 days.

(21) Appl. No.: 10/317,282

(22) Filed: Dec. 13, 2002

(51) Int. Cl.[7] .............................................. B60R 19/28
(52) U.S. Cl. ........................ 293/137; 296/134; 296/107
(58) Field of Search ................................ 293/107, 117, 293/133, 134, 137, 132, 135, 136

(56) References Cited

U.S. PATENT DOCUMENTS

| | | | | |
|---|---|---|---|---|
| 1,691,398 A | * | 11/1928 | Long | 293/137 |
| 3,097,725 A | * | 7/1963 | Peterson | 293/133 |
| 3,226,146 A | * | 12/1965 | Behr | 293/137 |
| 3,333,880 A | * | 8/1967 | Tavano, Sr. | 293/132 |
| 3,362,742 A | * | 1/1968 | Sanderson | 293/134 |
| 3,759,558 A | * | 9/1973 | Komatsu | 293/134 |
| 4,592,580 A | * | 6/1986 | Stanganelli et al. | 293/137 |
| 4,807,915 A | * | 2/1989 | Shyi | 293/137 |
| 5,298,882 A | | 3/1994 | Tsai | |
| 5,396,424 A | | 3/1995 | Moriyama et al. | |
| 5,486,808 A | | 1/1996 | Nejdl | |
| 5,593,195 A | * | 1/1997 | Lei | 293/134 |
| 6,217,090 B1 | * | 4/2001 | Berzinji | 293/137 |
| 6,536,818 B1 | * | 3/2003 | Moss | 293/134 |

* cited by examiner

Primary Examiner—D. Glenn Dayoan
Assistant Examiner—Jason Morrow
(74) Attorney, Agent, or Firm—Donald R. Schoonover

(57) ABSTRACT

The force and energy associated with a collision of a land vehicle is absorbed by a multiple stage system which includes a first stage associated with low impact collisions and a second stage that is associated with high impact collisions. The first stage includes a spring system located in the bumpers of the vehicle and the second stage includes springs and fluid shock absorbers and is located beneath the chassis of the vehicle.

3 Claims, 3 Drawing Sheets

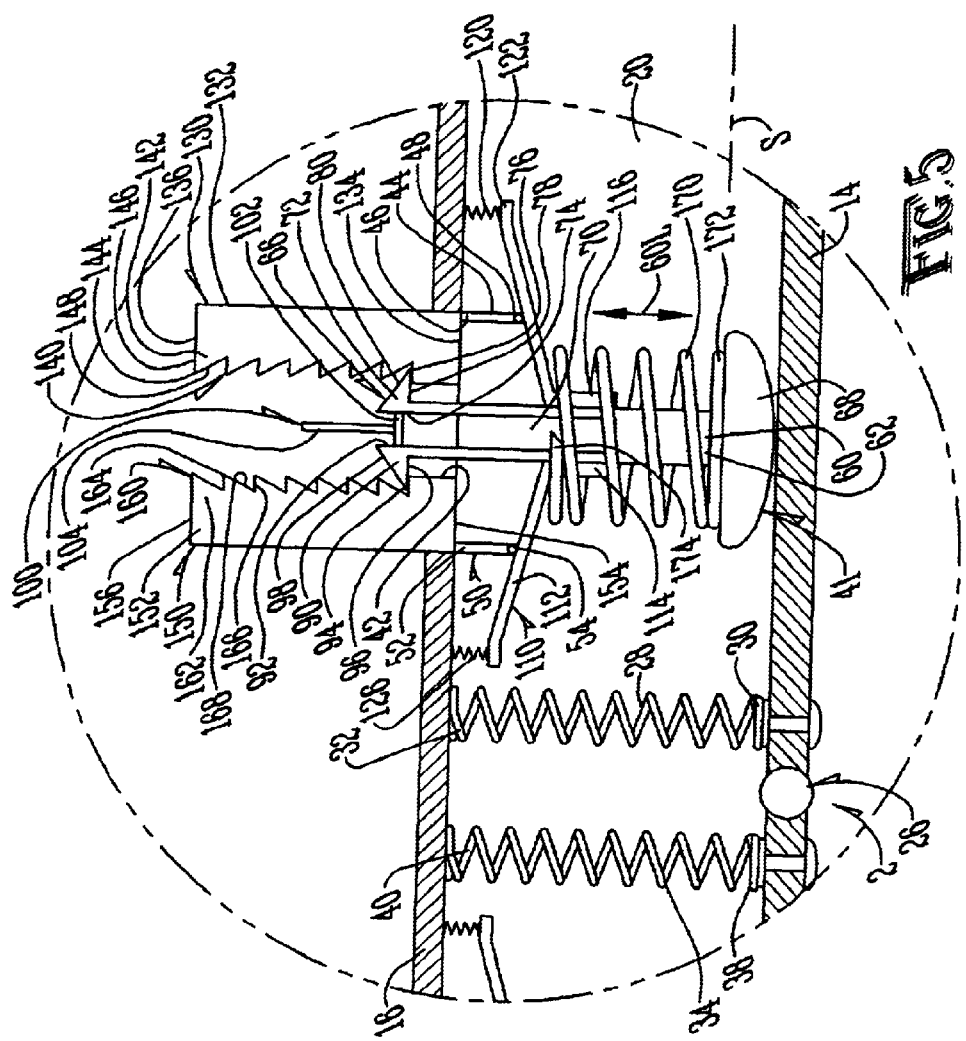

MULTIPLE STAGE SYSTEM FOR ABSORBING FORCE AND ENERGY ASSOCIATED WITH COLLISIONS OF A LAND VEHICLE

BACKGROUND OF THE INVENTION

1. Field of the Invention

The present invention relates to the general art of land vehicles and to the particular field of collision impact absorption.

2. Discussion of the Related Art

The death and injury toll associated with automobile collisions in the United States, and around the world, is frightening. Deaths associated with automobile accidents in the United States alone exceeds fifty thousand per year.

While automobiles are safer each year and safety is improved with each new model, there is always room for further improvements in the area of automobile safety, especially collision force and energy absorption.

Therefore, there is a need for a system for absorbing force and energy associated with a collision of a land vehicle.

While many automobiles have special designs for absorbing the force and energy associated with a collision, such as special crumple zones, and the like, these designs generally are directed to protecting the occupants of the vehicle from high impact collisions. Of course, high impact collision protection is important; however, much damage can be done to the vehicle and/or the occupants of the vehicle in low impact collisions as well. Again, many automobiles have systems for protecting the vehicle and/or the occupants from low impact collisions. An example of this type of system is the simple vehicle bumper. However, even when such bumper systems are combined with crumple zones and the like, there is still much room for improvement in the protection of vehicle occupants from the energy and force associated with vehicle collisions.

Therefore, there is a need for a system for absorbing force and energy associated with a collision of a land vehicle which includes a plurality of stages. Still further, there is a need for a system for absorbing force and energy associated with a collision of a land vehicle which includes a plurality of stages including a low impact stage and a high impact stage.

PRINCIPAL OBJECTS OF THE INVENTION

It is a main object of the present invention to provide a system for absorbing force and energy associated with a collision of a land vehicle.

It is another object of the present invention to provide a system for absorbing force and energy associated with a collision of a land vehicle which includes a plurality of stages.

It is another object of the present invention to provide a system for absorbing force and energy associated with a collision of a land vehicle which includes a first stage associated with low impact collisions.

It is another object of the present invention to provide a system for absorbing force and energy associated with a collision of a land vehicle which includes a stage associated with high impact collisions.

SUMMARY OF THE INVENTION

These, and other, objects are achieved by a system for absorbing force and energy associated with a collision of a land vehicle which comprises a first stage absorbing system which includes a plurality of spring units in a bumper of a land vehicle, each spring unit including a compression spring and a rod, and a one-way mechanism on the rod which permits the rod to move one way against the force of the compression spring and which includes locks that prevent the rod from moving in an opposite direction under force exerted thereon by the compression spring; and a second stage absorbing system which includes a plurality of shafts extending in a length direction of the land vehicle, a stationary mounting bracket fixed to the land vehicle and which slidably accommodates two shafts with the shafts being offset from each other, a movable spring mounting bracket slidably mounted on each shaft, a fixed spring mounting bracket fixedly mounted on each shaft, a first compression spring having one end thereof mounted on the stationary mounting bracket and a second end thereof mounted on the movable mounting bracket on each shaft, a second compression spring having one end thereof mounted on the fixed spring mounting bracket of each shaft and a second end thereof mounted on the movable spring mounting bracket on each shaft, the first compression spring being aligned with the second compression spring on each shaft, a first hydraulic spring unit having one end thereof mounted on the stationary mounting bracket and a second end thereof mounted on the movable mounting bracket on each shaft, a second hydraulic spring unit having one end thereof mounted on the fixed spring mounting bracket on each shaft and a second end thereof mounted on the movable spring mounting bracket on each shaft, and the first compression spring of one shaft mounted on the stationary mounting bracket being aligned with the first hydraulic spring unit of a second shaft mounted on the stationary mounting bracket.

The first stage accommodates low force and/or energy collisions while the second stage accommodates high force and/or energy collisions. The lock on the compression springs of the first stage prevents the springs from releasing the energy stored therein during the energy absorption of the first stage. The second stage uses the energy absorbing capabilities of the first stage and thus is able to accommodate even higher energies. Thus, a vehicle is protected for both low energy impact as well as high energy impact.

BRIEF DESCRIPTION OF THE DRAWING FIGURES

FIG. 5 is an enlarged top plan view of the area identified as Detail A in FIG. 4.

FIG. 6 is a perspective view of the area identified as Detail B in FIG. 4.

FIG. 7 is an enlarged schematic view of a shock absorber used in the second stage of the multiple stage crash force and energy system of the present invention.

DETAILED DESCRIPTION OF THE INVENTION

Other objects, features and advantages of the invention will become apparent from a consideration of the following detailed description and the accompanying drawings.

Figure 1:
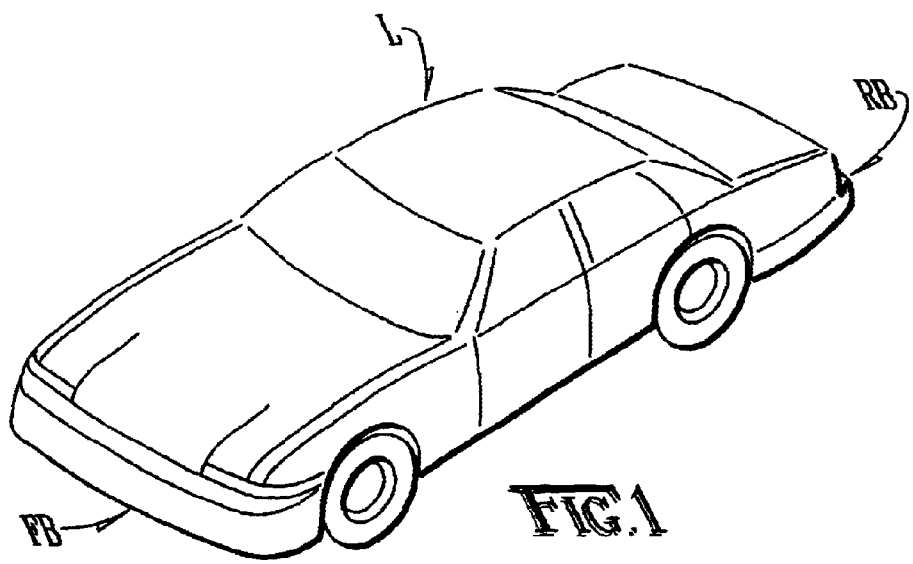
FIG. 1 is a perspective view of a land vehicle which incorporates the crash force and energy absorbing system embodying the present invention.
Figure 2:
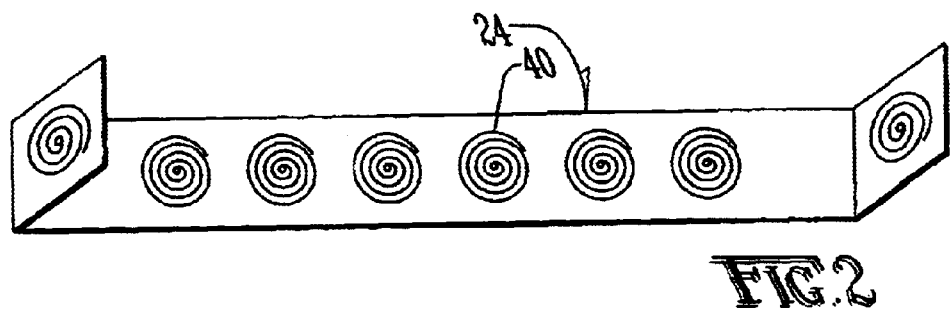
FIG. 2 is a perspective view of a bumper that includes a first stage of the multiple stage crash force and energy absorbing system embodying the present invention.
Figure 3:
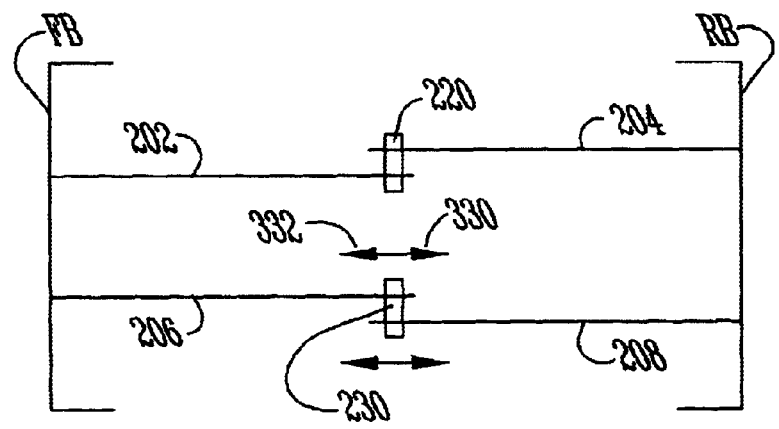
FIG. 3 is a schematic illustrating the second stage of the multiple stage crash force and energy absorbing system embodying the present invention.
Figure 4:
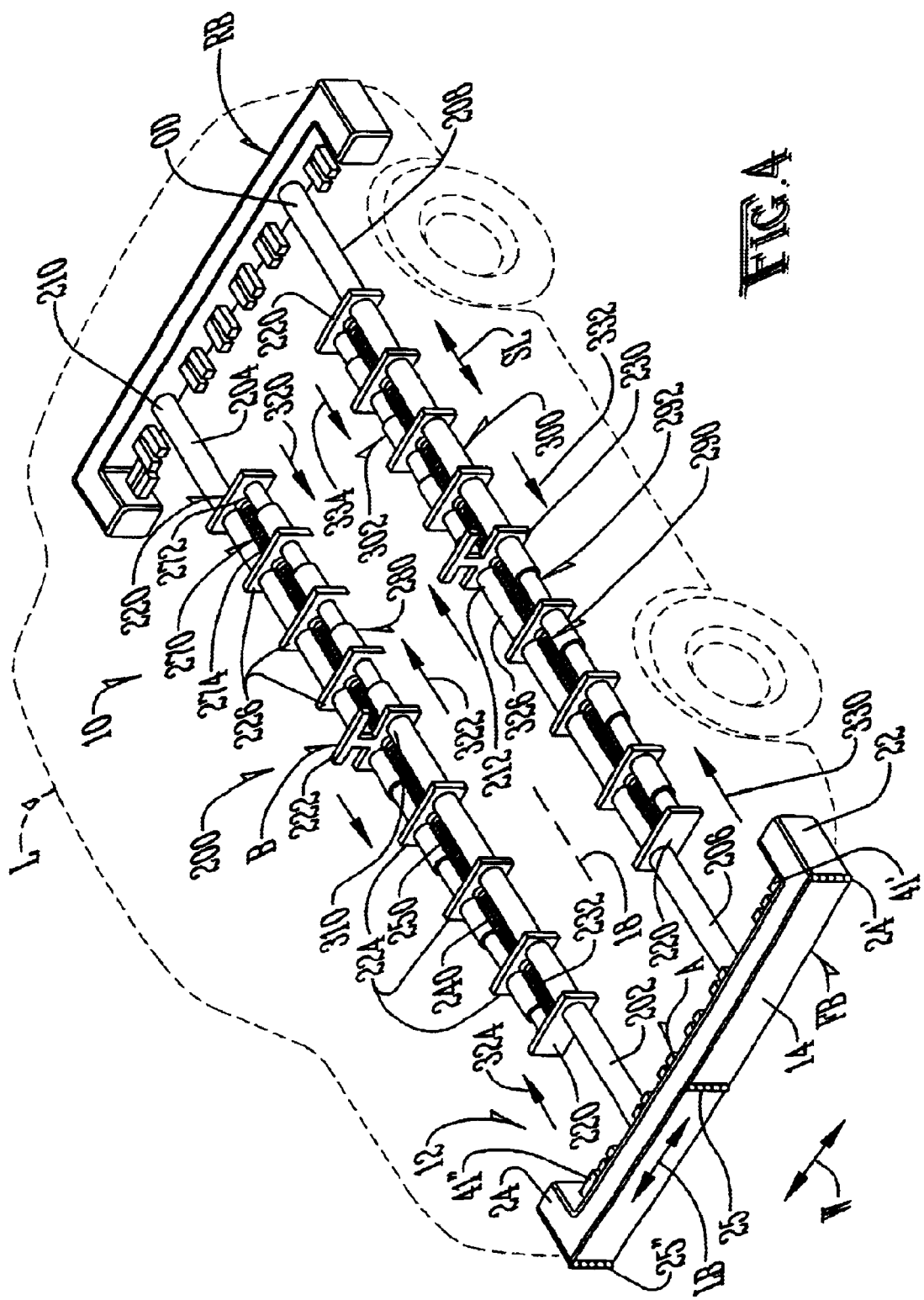
FIG. 4 is a perspective view of the multiple stage crash force and energy absorbing system embodying the present invention.

Shown in the FIG. 1 is a land vehicle L, such as an automobile, that will incorporate the force and energy absorbing system of the present invention. Land vehicle L includes a front bumper FB and rear bumper RB. A first stage of the system embodying the present invention is incorporated in the bumpers as indicated in FIG. 2, and a second stage of the system of the present invention is located beneath the chassis of the vehicle as indicated in FIG. 4. The second stage is shown schematically in FIG. 3 where it can be seen that the second stage of the system works in co-operation with the first stage system and has elements that move toward and away from the bumpers during the force and energy absorbing operation. Thus, the first stage includes movement of the bumpers and the second stage includes movement of the elements shown in FIG. 3. The stages will be discussed in greater detail below.

Referring to FIGS. 4–6, it can be understood that the present invention is embodied in a system 10 for absorbing force and energy associated with a collision of a land vehicle.

As mentioned above, system 10 includes a first stage force and energy absorbing system 12 which is shown in FIGS. 4 and 5 and includes two bumpers FB and RB on land vehicle L. Each of the bumpers includes a first wall 14 and a second wall 16 spaced apart from the first wall 14 in a length direction 18 of land vehicle L on which the two bumpers are mounted. A gap 20 is defined between the first wall 14 and the second wall 16, and each of the bumpers extends across a width dimension W of the land vehicle on which they are mounted. Each bumper has a first end 22 located on one side of the land vehicle and a second end 24 located on another side of the land vehicle. Each of the bumpers has a length dimension LB which extends between the first end 22 of the bumper and the second end 24 of the bumper.

A plurality of joints, such as joint 25, are located in the first wall of each of the bumpers. Each joint 25 permits the bumper wall to flex as necessary to absorb force and energy as will be understood from the teaching of this disclosure. Each joint 25 includes a hinge 26 in the first wall 14 of the bumper, a first compression spring 28 located adjacent to the hinge 26 and fixed to the first wall 14 at one end 30 thereof and fixed to the second wall 16 at a second end 32 thereof. A second compression spring 34 is located adjacent to the hinge 26 and is fixed to the first wall 14 at one end 38 thereof and is fixed to the second wall 16 at a second end 40 thereof. Hinge 26 is interposed between the first spring 28 and the second spring 34. The joints 25 of the plurality of joints are spaced apart from each other in the direction of the length dimension 18 of the bumper, and one joint 25' is located adjacent to the first end 22 of each bumper and a second joint 25" is located adjacent to the second end 24 of each bumper.

The first force and energy absorbing system 12 further includes a plurality of energy absorbers, such as energy absorber 41, on each bumper. The energy absorbers 41 are spaced apart from each other in the direction of the length dimension 18 of each bumper, with one energy absorber 41' located adjacent to the first end 22 of each bumper and a second energy absorber 41" located adjacent to the second end 24 of each bumper. Like the joints 25, the energy absorbers 41 are identical to each other. Thus, only one energy absorber 41 will be described. Each energy absorber 41 includes a hole 42 defined through the second wall 16 of the bumper associated therewith, a first pivot pin 44 located adjacent to the hole 42 and having one end 46 fixed to the second wall 16 of the bumper associated therewith adjacent to the hole 42 and a second end 48 located in gap 20. A second pivot pin 50 is located adjacent to the hole 42 and has one end 52 fixed to the second wall 16 of the bumper associated therewith adjacent to the hole 42 and a second end 54 located in gap 20. Hole 42 is interposed between the first pivot pin 44 and the second pivot pin 50.

Each energy absorber 41 of the first system 12 further includes a cylindrical rod 60 extending through hole 42. Rod 60 has a first end 62 located adjacent to first wall 14 and a second end 66 located adjacent to second wall 16 of the bumper associated therewith. A head 68 is located on first end 62 of rod 60 and is located to abut first wall 14 during operation of the energy absorber 41. Rod 60 includes a length dimension 60L which extends between the first end 62 of the rod 60 and the second end 66 of the rod 60, and a blind-ended bore 70 is defined along the length dimension 60L of the rod 60 from the second end 66 of the rod 60 towards the first end 62 of the rod 60. A first triangular foot 72 is located on the second end 66 of the rod 60. First triangular foot 72 includes a base 74 on the rod 60, an apex 76 spaced apart from the rod 60, and a leg 78 connects the base 74 of the first triangular foot 72 to the apex 76 of the first triangular foot 72. Leg 78 of the first triangular foot 72 extends radially outward from the rod 60, and a hypotenuse 80 connects base 74 of the first triangular foot 72 and apex 76 of the first triangular foot 72. Leg 78 of the first triangular foot 72 is interposed between the hypotenuse 80 of the first triangular foot 72 and second wall 16 of the bumper associated therewith.

A second triangular foot 90 is located on the second end 66 of the rod 60. The second triangular foot 90 is a mirror image of the first triangular foot 72 and includes a base 92 on the rod 60, an apex 94 spaced apart from the rod 60, a leg 96 connecting base 92 of the second triangular foot 90 to apex 94 of the second triangular foot 90. Leg 96 of the second triangular foot 90 extends radially outward from the rod 60 and is diametrically opposed to leg 78 of the first triangular foot 72. A hypotenuse 98 connects the base 92 of the second triangular foot 90 and the apex 94 of the second triangular foot 90. Leg 96 of the second triangular foot 90 is interposed between the hypotenuse 98 of the second triangular foot 90 and second wall 16 of the bumper associated therewith.

A lever arm 100 is interposed between first triangular foot 72 and second triangular foot 90. Lever arm 100 includes a head 102 in contact with the base of the first triangular foot and also in contact with the base 92 of the second triangular foot 90. A body 104 extends from the head 102 of the lever arm 100 in the direction of the length dimension 60L of the rod 60. The lever arm 100 is fixed to the triangular feet 72, 90 to keep them spaced apart as shown in FIG. 5.

The head 68 is located on the rod and is fixed to the rod 60 for movement therewith. Head 68 is located adjacent to the first wall 14 of the bumper associated therewith.

Energy absorber 41 further includes a conical housing 110. Housing 110 includes a skirt section 112 and an apex section 114. Apex section 114 includes a hollow cylindrical portion 116 which is fixed to the rod 60 to move therewith. The skirt section 112 of the conical housing 110 contacts second end 48 of the first pivot pin 44 and contacts second end 54 of the second pivot pin 50. A first compression spring 120 connects a first end 122 of the skirt section 112 of the conical housing 110 to the second wall 16 of the bumper associated therewith and a second compression spring 126 connects the first end 122 of the skirt section 112 of the conical housing 110 to the second wall 16 of the bumper associated therewith. Second compression spring 126 is spaced apart from first compression spring 120.

A first ratchet rack 130 is mounted on the second wall 16 of a bumper associated therewith adjacent to hole 42 and extends in the direction of the length dimension 60L of rod 60 which extends through hole 42 and extends away from second wall 16 and away from gap 20 defined between the first wall 14 of the bumper associated therewith and the second wall 16 of the bumper associated therewith. First ratchet rack 130 includes a body 132 having a first end 134 mounted on second wall 16 and a second end 136 spaced apart from the first end 134 of the first ratchet rack 130. A plurality of triangular teeth 140 are located on the first ratchet rack 130 and are spaced apart from each other in the direction of the length dimension 60L of rod 60. The triangular teeth 140 are identical with each other and each triangular tooth of the plurality of triangular teeth 140 includes a base 142 on the body 132 of the first ratchet rack 130, an apex 144 spaced apart from the body 132 of the first ratchet rack 130, a leg 146 extending from the base 142 of the triangular tooth 140 to the apex 144 of the triangular tooth 140 and a hypotenuse 148 extending from the apex 144 of the triangular tooth 140 to the base 142 of the triangular tooth 140. Hypotenuse 148 is interposed between leg 146 of the triangular tooth 140 and second wall 16 of the bumper associated therewith.

A second ratchet rack 150 is a mirror image of the first ratchet rack 130 and is mounted on second wall 16 of a bumper associated therewith adjacent to hole 42 defined through the second wall 16 of the bumper associated therewith. Rack 150 extends in the direction of the length dimension 60L of the rod 60 extending through hole 42 and extends away from the second wall 16 of the bumper associated therewith and away from gap 20. Second ratchet rack 150 is spaced apart from the first ratchet rack 130 with hole 42 interposed between the first ratchet rack 130 and the second ratchet rack 150. Second ratchet rack 150 includes a body 152 having a first end 154 mounted on the second wall 16 of the bumper associated therewith and a second end 156 spaced apart from the first end 154 of the second ratchet rack 150. A plurality of triangular teeth 160 are identical to each other and are spaced apart from each other in the direction of the length dimension 60L of the rod 60 extending through the hole 42. Each triangular tooth of the plurality of triangular teeth 160 of the second ratchet rack 150 includes a base 162 on the body 152 of the second ratchet rack 150, an apex 164 spaced apart from the body 152 of the second ratchet rack 150, a leg 166 extending from the base 162 of the triangular tooth 160 of the second ratchet rack 150 to the apex 164 of the triangular tooth 160 of the second ratchet rack 150 and a hypotenuse 168 which extends from the apex 164 of the triangular tooth 160 of the second ratchet rack 150 to the base 162 of the triangular tooth 160 of the second ratchet rack 150. Hypotenuse 168 is interposed between leg 166 of the triangular tooth 160 of the second ratchet rack 150 and the second wall 16 of the bumper associated therewith.

Rod 60 is movable between a first position with the first wall 14 of the bumper associated therewith being located at a first distance from the second wall 16 of the bumper associated therewith and a second position with the first wall 14 of the bumper associated therewith being located a second distance from the second wall 16 of the bumper associated therewith. The first position is shown in FIG. 5 in solid lines, and the second position is indicated by dotted line S in FIG. 5. The second distance is smaller than the first distance.

The hypotenuse 80, 98 of at least one of the triangular feet 72, 90 on the rod 60 engages the hypotenuse 148, 168 of at least one of the triangular teeth 140, 160 of the ratchet racks 130, 150 during the movement of the rod 60 from the first position to the second position and the leg 78, 96 of at least one of the triangular feet 72, 90 on the rod 60 engages the leg 146, 166 of at least one of the triangular teeth 140, 160 of the ratchet racks 130, 150 when the rod 60 moves from the second position toward the first position.

The leg 78 of the first triangular foot 72 and the leg 146 of the triangular tooth 140 of the first ratchet rack 130 both extend in a radial direction with respect to the rod 60. The leg 96 of the second triangular foot 90 and the leg 166 of the triangular tooth 160 of the second ratchet rack 150 both extend in a radial direction with respect to the rod 60.

A compression spring 170 surrounds rod 60 and has one end 172 seated on head 68 and the other end 174 seated on skirt section 112 of conical section 110 adjacent to cylindrical portion 112 of apex section 114.

As can be understood from the foregoing, if a bumper engages an object, the first wall 14 of the bumper will move toward the second wall 16 of the bumper. This movement will be against the force of spring 170. However, such movement forces the second end 66 of the rod 60 in a direction away from the second wall 16. As the rod 60 moves in this direction, the feet 72, 90 of the lever arm 100 slide over the teeth 140, 160 of the ratchet racks 130, 150 because of the relative orientations of the hypotenuses 80, 98, 148, 168 of these elements. However, due to the relative orientations of the legs 78, 96, 146, 166 of these triangular elements 72, 90, 140, 160, the rod 60 cannot return to its initial position. Hence spring 170 remains compressed and the energy stored in that spring 170 is not returned to the vehicle.

The system 10 of the present invention also includes a second stage force and energy absorbing system 200 which is best shown in FIG. 2.

Second stage 200 includes a plurality of shafts 202, 204, 206 and 208. Each shaft is fixed at a first end, such as end 210 of shaft 204 to the second wall 16 of one of the two bumpers. Each shaft 202, 204, 206, 208 extends in the length direction 18 of the land vehicle and has a second end, such as second end 212 of shaft 206, spaced apart from the first end of the shaft. Each shaft has an outer dimension OD and a longitudinal dimension SL. Each shaft is spaced apart from adjacent shafts, and the second end of each shaft is spaced apart from the second ends of adjacent shafts. The shafts are arranged in pairs, with two shafts of each pair being oriented to extend closely adjacent to each other. As can be seen in FIG. 4, shafts 202 and 204 form a first pair and shafts 206 and 208 form a second pair. The longitudinal dimensions of the shafts in each pair are spaced apart from each other in the width dimension of the land vehicle, and the pairs of shafts are spaced apart from each other along the width dimension of the land vehicle.

A plurality of mounting brackets are on each shaft. The mounting brackets on each shaft are spaced apart from each other along the longitudinal dimension of the shaft on which the mounting brackets are mounted. One mounting bracket 220 on each shaft is fixedly secured to the shaft. A first T-shaped vehicle mounting bracket 222 is fixedly mounted on the land vehicle and includes holes, such as holes 224 and 226 shown in FIG. 6, which respectively slidably accommodate the shafts 202 and 204 of the first pair of shafts. A second T-shaped vehicle mounting bracket 230 is fixedly mounted on the land vehicle and includes holes, that are sized in the manner just discussed in connection with bracket 222, to slidably accommodate shafts 206 and 208 of the second pair of shafts. The mounting brackets also include brackets such as bracket 224 on shaft 202 and brackets 226 on shaft 204, and corresponding brackets on shafts 206 and 208 which slide on the shafts. Thus, for example, brackets 224 on shaft 202 slide toward and away from stationary bracket 220 on shaft 202 while shafts 202 and 204 slide through vehicle mounting bracket 222.

A plurality of second stage compression spring units are associated with each shaft. These units include a first set of second stage compression springs, including compression spring 232, on first shaft 202, each second stage compression spring of the first set of second stage compression springs being located between each mounting bracket on the first shaft 202 and an adjacent mounting bracket on the first shaft 202. The second stage compression springs mounted with respect to the first shaft 202 are oriented to extend along the length dimension of the land vehicle and to have one end mounted on one mounting bracket and another end mounted on an adjacent mounting bracket on the first shaft 202.

A first set of hydraulic spring units 240, such as spring unit 250, are mounted with respect to the first shaft 202. Each hydraulic spring unit 250 of the first set of hydraulic spring units 240 is mounted between each mounting bracket on the first shaft 202 and is located adjacent to each second stage compression spring on the first shaft 202. The hydraulic spring units 250 are all identical to the unit shown in FIG. 7. Each of the hydraulic spring units 250 of the first set of units 240 mounted with respect to shaft 202 includes a cylinder 252 mounted on one mounting bracket on the first shaft 202, fluid 254 in the cylinder 252, and a seal 256 slidably mounted in the cylinder 252. The seal 256 has two one-way valves 258 and 260 so fluid 254 in the cylinder 252 can move from one chamber to the other in a manner common to such elements. A ram 262 has a first end 264 thereof connected to the seal 256 of the hydraulic spring unit 250 for movement therewith and a second end 266 fixed to a mounting bracket on the first shaft 202 and which is associated therewith. The hydraulic springs 250 of the first set of hydraulic springs 240 are oriented parallel to the second stage compression springs of the first set of second stage compression springs to operate in parallel therewith.

A second set of second stage compression springs 270 is mounted with respect to the second shaft 204. Each second stage compression spring of the second set of second stage compression springs 270 is located between each mounting bracket 220 on second shaft 204 and an adjacent mounting bracket on the second shaft 204. The second stage compression springs 270 mounted with respect to the second shaft 204 are oriented to extend along the length dimension of the land vehicle and to have one end 272 mounted on one mounting bracket 220 and another end 274 mounted on an adjacent mounting bracket 220 on the second shaft 204.

A second set 280 of hydraulic spring units is mounted with respect to the second shaft 204. The hydraulic spring units on the second, third and fourth shafts 204, 206, 208 are all identical to the hydraulic spring units 250 shown in FIG. 7 and are identical to the hydraulic spring units 250 mounted with respect to first shaft 202. Thus, while each of the hydraulic spring units 250 will be described in detail in the interest of completeness, no further reference numbers in regard thereto will be attached to the respective units in the interest of clarity of the Figures. Each hydraulic spring unit of the second set of hydraulic spring units is mounted between each mounting bracket on the second shaft 204 and is located adjacent to each second stage compression spring on the second shaft 204. Each hydraulic spring unit of the second set of hydraulic spring units includes a cylinder mounted on one mounting bracket on the second shaft 204, fluid in the cylinder of the hydraulic spring of the second set of hydraulic spring units, and a seal slidably mounted in the cylinder of the hydraulic spring of the second set of hydraulic spring units. The seal of each of the hydraulic spring units of the second set of hydraulic spring units has two one-way valves and a ram having a first end thereof connected to the seal of the hydraulic spring unit of the second set of hydraulic spring units for movement therewith and a second end fixed to a mounting bracket on the second shaft 204 and which is associated therewith. The hydraulic springs of the second set of hydraulic springs are oriented parallel to the second stage compression springs of the second set of second stage compression springs to operate in parallel therewith.

A third set 290 of second stage compression springs are located on third shaft 206, each second stage compression spring of the third set of third stage compression springs is located between each mounting bracket on the third shaft 206 and an adjacent mounting bracket on the third shaft 206. The second stage compression springs on the third shaft 206 are oriented to extend along the length dimension of the land vehicle and to have one end mounted on one mounting bracket and another end mounted on an adjacent mounting bracket on the third shaft 206.

A third set 292 of hydraulic spring units is mounted with respect to third shaft 206. Each hydraulic spring unit of the third set of hydraulic spring units is mounted between each mounting bracket on the third shaft 206 and is located adjacent to each second stage compression spring on the third shaft 206. Each hydraulic spring unit of the third set of hydraulic spring units includes a cylinder mounted on one mounting bracket on the third shaft 206, fluid in the cylinder of the hydraulic spring of the third set of hydraulic spring units, and a seal slidably mounted in the cylinder of the hydraulic spring of the third set of hydraulic spring units. The seal having two one-way valves, and a ram having a first end thereof connected to the seal of the hydraulic spring unit of the third set of hydraulic spring units for movement therewith and a second end fixed to a mounting bracket on the third shaft 206 and which is associated therewith. The hydraulic springs of the third set of hydraulic springs being oriented parallel to the second stage compression springs of the third set of second stage compression springs to operate in parallel therewith.

A fourth set 300 of second stage compression springs are located on fourth shaft 208. Each second stage compression spring of the fourth set of second stage compression springs being located between a mounting bracket on fourth shaft 208 and an adjacent mounting bracket on the fourth shaft 208. The second stage compression springs on the fourth shaft 208 are oriented to extend along the length dimension of the land vehicle and to have one end mounted on one mounting bracket and another end mounted on an adjacent mounting bracket on the fourth shaft 208.

A fourth set 302 of hydraulic spring units is mounted with respect to the fourth shaft 208. Each hydraulic spring unit of the fourth set of hydraulic spring units is mounted between one mounting bracket on the fourth shaft 208 and an adjacent mounting bracket on the fourth shaft 208 and is located adjacent to each second stage compression spring on the fourth shaft 208. Each hydraulic spring unit of the fourth set of hydraulic spring units including a cylinder mounted on one mounting bracket on the fourth shaft 208, hydraulic fluid in the cylinder of the hydraulic spring of the fourth set of hydraulic spring units, and a seal slidably mounted in the cylinder of the hydraulic spring of the fourth set of hydraulic spring units. The seal has two one-way valves. A ram has a first end thereof connected to the seal of the hydraulic spring unit of the fourth set of hydraulic spring units for movement therewith and a second end fixed to a mounting bracket on the fourth shaft 208 and which is associated therewith. The hydraulic springs of the fourth set of hydraulic springs are oriented parallel to the second stage compression springs of the fourth set of second stage compression springs to operate in parallel therewith.

A second end 310 of first shaft 202 is slidably accommodated in first vehicle mounting bracket 222 and is in abutting contact with a cylinder of the second set of hydraulic spring units and which is mounted on the first vehicle mounting bracket. The first shaft 202 is aligned with the ram of a cylinder of the second set of hydraulic springs which is mounted of the first vehicle mounting bracket. Second shaft 204 is aligned with the ram of a cylinder of the first set of hydraulic cylinders mounted on the first vehicle mounting bracket. Second shaft 204 is slidably accommodated in the first vehicle mounting bracket for movement in directions 320 and 322 while first shaft 202 is slidably mounted for movement in directions 322 and 324.

A second end 326 of third shaft 206 is slidably accommodated in second vehicle mounting bracket 230 and is in abutting contact with a cylinder of the fourth set of hydraulic springs and which is mounted on the second mounting bracket. The third shaft 206 is aligned with the ram of a cylinder of the fourth set of hydraulic springs which is mounted on the second vehicle mounting bracket and the fourth shaft 208 is aligned with the ram of the cylinder of the third set of hydraulic cylinders mounted on the second vehicle mounting bracket. Fourth shaft 208 is slidably accommodated in the second vehicle mounting bracket. Thus, as can be seen in FIG. 4, third shaft 206 moves in directions 330 and 332 and fourth shaft 208 moves in directions 332 and 334.

As can be understood from the foregoing, movement of the shafts will be controlled by the compression springs and the hydraulic springs. Thus, energy and force associated with a collision of the land vehicle will be absorbed by the compression springs and the hydraulic springs of the second stage system.

It is understood that while certain forms of the present invention have been illustrated and described herein, it is not to be limited to the specific forms or arrangements of parts described and shown.

What is claimed and desired to be covered by Letters Patent is:

1. A system for absorbing force and energy associated with a collision of a land vehicle comprising:
   a) a first stage force and energy absorbing system which includes
      (1) two bumpers on a land vehicle, each of the bumpers including a first wall and a second wall spaced apart from the first wall in a length direction of a land vehicle on which the two bumpers are mounted and a gap defined between the first wall and the second wall, each of the bumpers extending across a width dimension of the land vehicle on which they are mounted and having a first end located on one side of the land vehicle and a second end located on another side of the land vehicle, each of the bumpers having a length dimension extending between the first end of the bumper and the second end of the bumper,
      (2) a plurality of joints in the first wall of each of the bumpers, each joint including
         (A) a hinge in the first wall of the bumper,
         (B) a first compression spring located adjacent to the hinge and fixed to the first wall at one end of the first spring and fixed to the second wall at a second end of the spring, and
         (C) a second compression spring located adjacent to the hinge and fixed to the first wall at one end of the second spring and fixed to the second wall at a second end of the spring, the hinge being interposed between the first spring and the second spring,
      (3) the plurality of joints being spaced apart from each other in the direction of the length dimension of the bumper, and
      (4) one joint being located adjacent to the first end of each bumper and a second joint being located adjacent to the second end of each bumper, and
      (5) a plurality of energy absorbers on each bumper, the energy absorbers being spaced apart from each other in the direction of the length dimension of each bumper, with one energy absorber being located adjacent to the first end of each bumper and a second energy absorber being located adjacent to the second end of each bumper, each energy absorber including
         (A) a hole defined through the second wall of the bumper associated therewith,
         (B) a first pivot pin located adjacent to the hole and having one end fixed to the second wall of the bumper associated therewith adjacent to the hole and a second end located in the gap defined between the first wall of the bumper associated therewith and the second wall of the bumper associated therewith,
         (C) a second pivot pin located adjacent to the hole and having one end fixed to the second wall of the bumper associated therewith adjacent to the hole and a second end located in the gap defined between the first wall of the bumper associated therewith and the second wall of the bumper associated therewith,
         (D) the hole being interposed between the first pivot pin and the second pivot pin,
         (E) a cylindrical rod extending through the hole and having a first end located adjacent to the first wall of the bumper associated therewith and a second end located adjacent to the second wall of the bumper associated therewith, the rod including
            (i) a length dimension extending between the first end of the rod and the second end of the rod,
            (ii) a blind-ended bore defined along the length dimension of the rod from the second end of the rod towards the first end of the rod,
            (iii) a first triangular foot on the second end of the rod, the first triangular foot including a base on the rod, an apex spaced apart from the rod, a leg connecting the base of the first triangular foot to the apex of the first triangular foot, the leg of the first triangular foot extending radially outward from the rod, and a hypotenuse connecting the base of the first triangular foot and the apex of the first triangular foot, the leg of the first triangular foot being interposed between the hypotenuse of the first triangular foot and the second wall of the bumper associated therewith,
            (iv) a second triangular foot on the second end of the rod, the second triangular foot including a base on the rod, an apex spaced apart from the rod, a leg connecting the base of the second triangular foot to the apex of the second triangular foot, the leg of the second triangular foot extending radially outward from the rod and being diametrically opposed to the leg of the first triangular foot, and a hypotenuse connecting the base of the second triangular foot and the apex of the second triangular foot, the leg of the second triangular foot being interposed between the hypotenuse of the second triangular foot and the second wall of the bumper associated therewith and (v) a lever arm interposed between the first triangular foot and the second triangular foot and including a head in contact with the base of the first triangular foot and also in contact with the base of the second triangular foot and a body extending from the head of the lever arm in the direction of the length dimension of the rod, (F) a head on the rod, the head being fixed to the rod for movement therewith and the head being located adjacent to the first wall of the bumper associated therewith, (G) a conical housing having a skirt section and an apex section, the apex section including a hollow cylindrical portion, the hollow cylindrical portion being fixed to the rod to move therewith, (H) the skirt section of the conical housing contacting the second end of the first pivot pin and contacting the second end of the second pivot pin, (I) a first compression spring connecting a first end of the skirt section of the conical housing to the second wall of the bumper associated therewith, (J) a second compression spring connecting the first end of the skirt section of the conical housing to the second wall of the bumper associated therewith, the second compression spring being spaced apart from the first compression spring, (K) a first ratchet rack mounted on the second wall of a bumper associated therewith adjacent to the hole defined through the second wall of the bumper associated therewith and extending in the direction of the length dimension of the rod extending through the hole in the bumper associated therewith and extending away from the second wall of the bumper associated therewith and away from the gap defined between the first wall of the bumper associated therewith and the second wall of the bumper associated therewith, the first ratchet rack including a body having a first end mounted on the second wall of the bumper associated therewith and a second end spaced apart from the first end of the ratchet rack, plurality of triangular teeth which are spaced apart from each other in the direction of the length dimension of the rod extending through the hole in the second wall of the bumper associated therewith, each triangular tooth of the plurality of triangular teeth including a base on the body of the first ratchet rack, an apex spaced apart from the body of the first ratchet rack, a leg extending from the base of the triangular tooth to the apex of the triangular tooth and a hypotenuse extending from the apex of the triangular tooth to the base of the triangular tooth, the hypotenuse being interposed between the leg of the triangular tooth and the second wall of the bumper associated therewith, (L) a second ratchet rack mounted on the second wall of a bumper associated therewith adjacent to the hole defined through the second wall of the bumper associated therewith and extending in the direction of the length dimension of the rod extending through the hole in the bumper associated therewith and extending away from the second wall of the bumper associated therewith and away from the gap defined between the first wall of the bumper associated therewith and the second wall of the bumper associated therewith, the second ratchet rack being spaced apart from the first ratchet rack with the hole being interposed between the first ratchet rack and the second ratchet rack, the second ratchet rack including a body having a first end mounted on the second wall of the bumper associated therewith and a second end spaced apart from the first end of the second ratchet rack, plurality of triangular teeth which are spaced apart from each other in the direction of the length dimension of the rod extending through the hole in the second wall of the bumper associated therewith, each triangular tooth of the plurality of triangular teeth of the second ratchet rack including a base on the body of the second ratchet rack, an apex spaced apart from the body of the second ratchet rack, a leg extending from the base of the triangular tooth of the second ratchet rack to the apex of the triangular tooth of the second ratchet rack and a hypotenuse extending from the apex of the triangular tooth of the second ratchet rack to the base of the triangular tooth of the second ratchet rack, the hypotenuse of the tooth on the second ratchet rack being interposed between the leg of the triangular tooth of the second ratchet rack and the second wall of the bumper associated therewith, (M) the rod being movable between a first position with the first wall of the bumper associated therewith being located at a first distance from the second wall of the bumper associated therewith and a second position with the first wall of the bumper associated therewith being located a second distance from the second wall of the bumper associated therewith, with the second distance being smaller than the first distance, (N) the hypotenuse of one of the triangular feet on the shaft engaging the hypotenuse of at least one of the triangular teeth of the first ratchet rack during the movement of the rod from the first position to the second position and the leg of at least one tooth of the triangular teeth on the rod engaging the leg of at least one of the first triangular teeth of the ratchet racks when the rod moves from the second position toward the first position, (O) the leg of the first triangular foot and the leg of the triangular tooth of the first ratchet rack both extending in a radial direction with respect to the rod, (P) the leg of the second triangular foot and the leg of the triangular tooth of the second ratchet rack both extending in a radial direction with respect to the rod, and (Q) a compression spring surrounding the rod and having one thereof end seated on the head of the rod and another end thereof seated on the skirt section of the conical section adjacent to the cylindrical portion of the apex section; and b) a second stage force and energy absorbing system which includes
  (1) a plurality of shafts, with each shaft fixed at a first end thereof to the second wall of one of the two bumpers, each shaft extending in the length direction of the land vehicle and having a second end spaced apart from the first end of each shaft, each shaft having an outer dimension and a longitudinal dimension, and each shaft being spaced apart from adjacent shafts, the second end of each shaft being spaced apart from the second ends of adjacent shafts, the shafts being arranged in pairs, with two shafts of each pair being oriented to extend closely adjacent to each other with the longitudinal dimensions of the shafts in each pair being spaced apart from each other in the width dimension of the land vehicle, and with the pairs of shafts being spaced apart from each other along the width dimension of the land vehicle,
  (2) a plurality of mounting brackets on each shaft, the mounting brackets on each shaft being spaced apart from each other along the longitudinal dimension of the shaft on which the mounting brackets are mounted, one mounting bracket on each shaft being fixedly secured to the shaft,
  (3) a first vehicle mounting bracket fixedly mounted on the land vehicle and slidably accommodating both shafts of a first pair of shafts, and a plurality of additional mounting brackets on each shaft which are slidably mounted on each shaft,
  (4) a second vehicle mounting bracket fixedly mounted on the land vehicle and slidably accommodating both shafts of a second pair of shafts,
  (5) a plurality of second stage compression spring units associated with each shaft which includes
    (A) a first set of second stage compression springs on a first shaft, each second stage compression spring of the first set of second stage compression springs being located between each mounting bracket on the first shaft and an adjacent mounting bracket on the first shaft, the second stage compression springs on the first shaft being oriented to extend along the length dimension of the land vehicle and to have one end mounted on one mounting bracket and another end mounted on an adjacent mounting bracket on the first shaft,
    (B) a first set of hydraulic spring units mounted with respect to the first shaft, each hydraulic spring unit of the first set of hydraulic spring units being mounted between each mounting bracket on the first shaft and located adjacent to each second stage compression spring on the first shaft, each hydraulic spring unit of the first set of hydraulic spring units including
      (i) a cylinder mounted on one mounting bracket on the first shaft,
      (ii) a fluid in the cylinder of the hydraulic spring of the first set of hydraulic spring units,
      (iii) a seal slidably mounted in the cylinder of the hydraulic spring of the first set of hydraulic spring units, the seal having two one-way valves, and
      (iv) a ram having a first end thereof connected to the seal of the hydraulic spring unit of the first set of hydraulic spring units for movement therewith and a second end fixed to a mounting bracket on the first shaft and which is associated therewith,
    (C) the hydraulic springs of the first set of hydraulic springs being oriented parallel to the second stage compression springs of the first set of second stage compression springs to operate in parallel therewith,
    (D) a second set of second stage compression springs on a second shaft, each second stage compression spring of the second set of second stage compression springs being located between each mounting bracket on a second shaft and an adjacent mounting bracket on the second shaft, the second stage compression springs on the second shaft being oriented to extend along the length dimension of the land vehicle and to have one end mounted on one mounting bracket and another end mounted on an adjacent mounting bracket on the second shaft,
    (E) a second set of hydraulic spring units mounted with respect to the second shaft, each hydraulic spring unit of the second set of hydraulic spring units being mounted between each mounting bracket on the second shaft and located adjacent to each second stage compression spring on the second shaft, each hydraulic spring unit of the second set of hydraulic spring units including
      (i) a cylinder mounted on one mounting bracket on the second shaft,
      (ii) a fluid in the cylinder of the hydraulic spring of the second set of hydraulic spring units,
      (iii) a seal slidably mounted in the cylinder of the hydraulic spring of the second set of hydraulic spring units, the seal having two one-way valves, and
      (iv) a ram having a first end thereof connected to the seal of the hydraulic spring unit of the second set of hydraulic spring units for movement therewith and a second end fixed to a mounting bracket on the second shaft and which is associated therewith,
    (F) the hydraulic springs of the second set of hydraulic springs being oriented parallel to the second stage compression springs of the second set of second stage compression springs to operate in parallel therewith,
    (G) a third set of third stage compression springs on a third shaft, each third stage compression spring of the third set of third stage compression springs being located between each mounting bracket on a third shaft and an adjacent mounting bracket on the third shaft, the third stage compression springs on the third shaft being oriented to extend along the length dimension of the land vehicle and to have one end mounted on one mounting bracket and another end mounted on an adjacent mounting bracket on the third shaft,
    (H) a third set of hydraulic spring units mounted with respect to the third shaft, each hydraulic spring unit of the third set of hydraulic spring units being mounted between a mounting bracket on the third shaft and an adjacent mounting bracket on the third shaft and being located adjacent to each second stage compression spring on the third shaft, each hydraulic spring unit of the third set of hydraulic spring units including
      (i) a cylinder mounted on one mounting bracket on the third shaft, (ii) a fluid in the cylinder of the hydraulic spring of the third set of hydraulic spring units,
(iii) a seal slidably mounted in the cylinder of the hydraulic spring of the third set of hydraulic spring units, the seal having two one-way valves, and
(iv) a ram having a first end thereof connected to the seal of the hydraulic spring unit of the third set of hydraulic spring units for movement therewith and a second end fixed to a mounting bracket on the third shaft and which is associated therewith,
(I) the hydraulic springs of the third set of hydraulic springs being oriented parallel to the second stage compression springs of the third set of second stage compression springs to operate in parallel therewith,
(J) a fourth set of second stage compression springs on a fourth shaft, each second stage compression spring of the fourth set of second stage compression springs being located between a mounting bracket on a fourth shaft and an adjacent mounting bracket on the fourth shaft, the second stage compression springs on the fourth shaft being oriented to extend along the length dimension of the land vehicle and to have one end mounted on one mounting bracket and another end mounted on an adjacent mounting bracket on the fourth shaft,
(K) a fourth set of hydraulic spring units mounted with respect to the fourth shaft, each hydraulic spring unit of the fourth set of hydraulic spring units being mounted between a mounting bracket on the fourth shaft and an adjacent mounting bracket on the fourth shaft and being located adjacent to each second stage compression spring on the fourth shaft, each hydraulic spring unit of the fourth set of hydraulic spring units including
(i) a cylinder mounted on one mounting bracket on the fourth shaft,
(ii) a fluid in the cylinder of the hydraulic spring of the fourth set of hydraulic spring units,
(iii) a seal slidably mounted in the cylinder of the hydraulic spring of the fourth set of hydraulic spring units, the seal having two one-way valves, and
(iv) a ram having a first end thereof connected to the seal of the hydraulic spring unit of the fourth set of hydraulic spring units for movement therewith and a second end fixed to a mounting bracket on the fourth shaft and which is associated therewith, and
(L) the hydraulic springs of the fourth set of hydraulic springs being oriented parallel to the second stage compression springs of the fourth set of second stage compression springs to operate in parallel therewith,
(6) a second end of the first shaft being slidably accommodated in the first vehicle mounting bracket which accommodates the first and second shafts and being in abutting contact with a cylinder of the second set of hydraulic spring units and which is mounted on the first vehicle mounting bracket, the first shaft being aligned with the ram of a cylinder of the second set of hydraulic springs which is mounted of the first vehicle mounting bracket and the second shaft being aligned with the ram of a cylinder of the first set of hydraulic cylinders mounted on the first vehicle mounting bracket, the second shaft being slidably accommodated in the first vehicle mounting bracket, and
(7) a second end of the third shaft being slidably accommodated in the second vehicle mounting bracket and being in abutting contact with a cylinder of the fourth set of hydraulic springs mounted on the second vehicle mounting bracket, the third shaft being aligned with the ram of a cylinder of the fourth set of hydraulic springs which is mounted on the second vehicle mounting bracket and the fourth shaft being aligned with the ram of the cylinder of the third set of hydraulic cylinders mounted on the second vehicle mounting bracket, the fourth shaft being slidably accommodated in the second vehicle mounting bracket.

2. The system as described in claim 1 wherein the first and second vehicle mounting brackets are each T-shaped.

3. A system for absorbing force and energy associated with a collision of a land vehicle comprising:
a) a first stage absorbing system which includes a plurality of spring units in a bumper of a land vehicle, each spring unit including a compression spring and a rod, and a one-way mechanism on the rod which permits the rod to move one way against the force of the compression spring and which includes locks that prevent the rod from moving in an opposite direction under force exerted thereon by the compression spring; and
b) a second stage absorbing system which includes
(1) a plurality of shafts extending in a length direction of the land vehicle,
(2) a stationary mounting bracket fixed to the land vehicle and which slidably accommodates two shafts with the shafts being offset from each other,
(3) a movable spring mounting bracket slidably mounted on each shaft,
(4) a fixed spring mounting bracket fixedly on each shaft,
(5) a first compression spring having one end thereof mounted on the stationary mounting bracket and a second end thereof mounted on the movable mounting bracket on each shaft,
(6) a second compression spring having one end thereof mounted on the fixed spring mounting bracket of each shaft and a second end thereof mounted on the movable spring mounting bracket on each shaft,
(7) the first compression spring being aligned with the second compression spring on each shaft,
(8) a first hydraulic spring unit having one end thereof mounted on the stationary mounting bracket and a second end thereof mounted on the movable mounting bracket on each shaft,
(9) a second hydraulic spring unit having one end thereof mounted on the fixed spring mounting bracket on each shaft and a second end thereof mounted on the movable spring mounting bracket on each shaft, and
(10) the first compression spring of one shaft mounted on the stationary mounting bracket being aligned with the first hydraulic spring unit of a second shaft mounted on the stationary mounting bracket.

* * * * *